Oct. 24, 1967    L. DUBIN ET AL    3,348,609
MULTI-POSITIONAL POWER SUPPLY MODULE AND HEAT
EXCHANGE TECHNIQUES
Filed April 29, 1966    3 Sheets-Sheet 1

INVENTORS
LESTER DUBIN
MAURICE G. PAULSON
BENJAMIN SHMURAK

Morgan, Finnegan, Durham & Pine
ATTORNEYS.

INVENTORS
LESTER DUBIN
MAURICE G. PAULSON
BENJAMIN SHMURAK

ATTORNEYS.

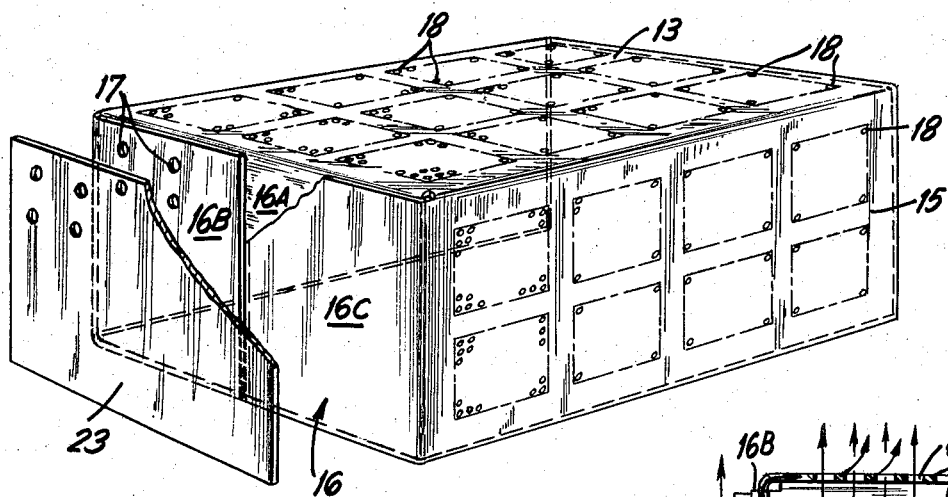
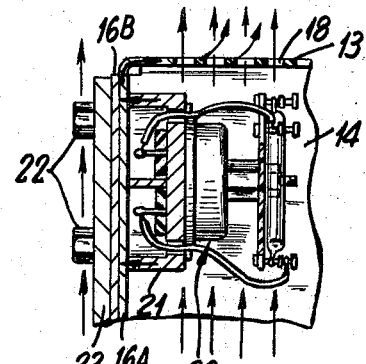
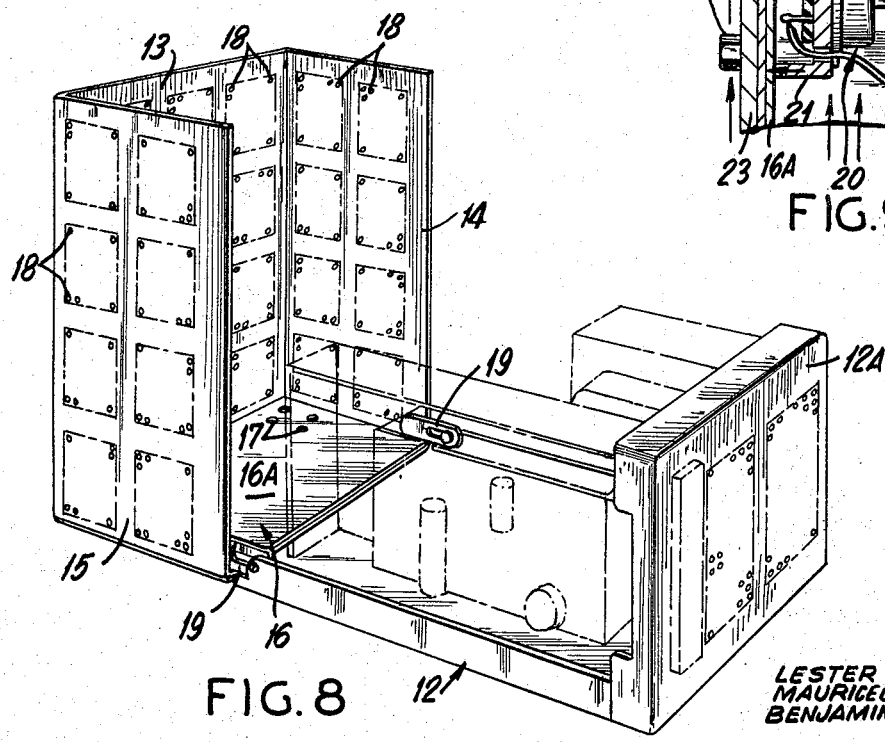

United States Patent Office 3,348,609
Patented Oct. 24, 1967

3,348,609
MULTI-POSITIONAL POWER SUPPLY MODULE
AND HEAT EXCHANGE TECHNIQUES
Lester Dubin, Pelham Manor, Maurice G. Paulson, Huntington, and Benjamin Shmurak, Lynbrook, N.Y., assignors to Lambda Electronics Corporation, Melville, N.Y., a corporation of New York
Filed Apr. 29, 1966, Ser. No. 546,222
15 Claims. (Cl. 165—47)

ABSTRACT OF THE DISCLOSURE

A modular power supply device having an outer cover of orthogonally interconnected planar surfaces which serves as an orientation insensitive heat exchanger for the heat generating temperature sensitive components of the supply permitting the module to be mounted during operation on any one of a plurality of the orthogonal planar surfaces of the cover without the need for derating. The cover includes an apertured central panel, two apertured side panels extending orthogonally from opposite edges of the central panel, and a rear panel formed from integral flap extensions of the central and side panels bent and arranged in overlapping heat conductive relation, the heat generating components being directly thermally coupled to the rear panel as by bolting to the innermost flap of the panel.

---

This invention relates generally to heat exchange structures and techniques, and more particularly, to heat exchangers which are also operable, simultaneously, as covers for modular electronic equipment such as power supplies.

Many of the components of electronic equipment, such as the power transistors of power supplies, generate large quantities of heat during use. Such components cannot function satisfactorily unless heat is rapidly and effectively removed therefrom and dissipated. Special heat exchanger units have heretofore been employed to achieve this result.

Use of these heat exchangers has, however, given rise to a number of shortcomings in the design and operation of equipment so built.

Many heat exchangers of the type heretofore employed are direction or orientation sensitive to a very large degree due to their configurations. The heat dissipating capability of the prior art heat exchanger is, in fact, so materially affected by its orientation that an electronic module can be operated at its full rating on only that one of its surfaces which provides the proper orientation for its heat exchanger unit. Derating, is required when the unit is to be operated in other orientations.

This becomes a serious limitation where a piece of equipment cannot fit into an opening of a cabinet or rack or into a particular rack adapter unless positioned on another of its surfaces; or where its required position in some environment, such as in a vehicle, is variable or dictates a position different from that required for effective heat exchange.

Furthermore, inasmuch as cabinets or racks are made to accommodate rack adapters of standard sizes, electronic modules could, if not for this orientation sensitivity, be designed dimensionally for operation in different of these rack adapters by positioning on different of their surfaces.

Another consequence of this limitation is the lack of facility with which the equipment can be serviced. Many procedures require that the electronic module be placed during operation on its side or end for servicing, and this cannot be safely done for a significant length of time where the result is the positioning of its heat exchanger in an improper orientation for effective heat dissipation.

Additionally, heat exchangers are necessarily confined to a location fixed by the location of the heat source because the heat generating components, e.g., power transistors must be mounted in good thermally conductive relation to the heat exchanger unit if effective cooling of these components is to be achieved. Many of such arrangements result in the heat exchanger unit being positioned internally of the module with the module cover inhibiting the dissipation of heat to the surrounding atmosphere, thereby requiring larger or additional heat exchange units to be employed than would otherwise be necessary for particular electronic modules. Also, many of such arrangements result in a certain amount of orientation sensitivity in the electronic module itself.

Aside from the aforementioned shortcomings in the prior art heat exchanger configurations, and regardless of where they are positioned with regard to the module, they take up a good deal of space which might otherwise be effectively utilized for other purposes.

Other prior art arrangements place the heat exchanger units externally of the module in order to avoid the heat dissipating limitations inherent in the internal placement of such units and in an effort to obtain more efficiently packaged and compact units. However, such external placement necessarily limits the number of outer cover surfaces which are available for mounting of the module, the conventional heat exchanger having fins which project from the surfaces to which they are secured. These disadvantages also characterize equipment which has its electronic heat generating components mounted on the outside of its chassis enclosure.

Accordingly, it is an object of the instant invention to provide heat exchange techniques for use in electronic equipment such as modular power supplies which so reduces orientation sensitivity as to permit operation of such equipment in a plurality of orientations without the need for derating from one orientation to another.

It is another object of the instant invention to provide heat exchange techniques for use in electronic equipment such as modular power supplies which permits operation of such equipment in a plurality of orientations at higher aggregate ratings than has been heretofore attainable with prior art heat exchangers and techniques.

It is a further object of the instant invention to provide a heat exchanger for modular electronic equipment such as power supplies which takes the form of a cover for at least partially enclosing the components of such equipment thereby eliminating the need for separate heat exchanger units.

It is still a further object of the instant invention to provide heat exchange techniques for use in modular electronic equipment such as power supplies which eliminates the need for external placement of fins and other protrusions and projections from the outer surfaces of the chassis enclosure by permitting the internal placement of the heat generating components of such equipment without the need for special heat dissipating units thereby providing for direct mounting of the equipment on any one of its outer enclosure surfaces.

Briefly and generally, the foregoing and other objects, features and advantages are accomplished in accordance with the instant invention by the provision of an orientation insensitive heat dissipator for the heat generating components of the equipment, e.g., the power transistors of a power supply, the heat dissipator having at least four planar interconnected heat dissipating panels arranged to form at least a partial outer enclosure for the equipment, one of said panels being integrally connected in an orthogonal relationship to each of the other three panels and having the heat generating components directly coupled thereto in a heat exchange relationship, each of a plurality of the panels having ventilation openings formed therein and being adapted for positioning of the equipment thereon during operation.

Such an arrangement provides a plurality of ventilated heat conducting and radiating cover panels disposed in a plurality of orientations orthogonal one to the other, all of the panels being thermally coupled to the heat source along continuous heat conductive paths so that, regardless of the orientation of the unit, there are always a sufficient number of vertically oriented panels in optimum heat conductive relation with the heat source to permit operation of the equipment in a plurality of different orientations without the need for derating from one orientation to another and without the need for a separate heat exchanger unit. Additionally, because all of the panels are ventilated and interconnected, those panels assuming horizontal orientations during use are functional as heat dissipating surfaces as well. Preferably, all the panels are interconnected in a unitary or integral construction for optimum heat distribution therebetween.

Briefly and generally, a method for accomplishing the heat exchange techniques in accordance with the invention comprises the steps of forming from heat conductive material a flat rectangular plate having a plurality of groups of apertures therein and a central and two side flaps extending in spaced-apart relation from one end thereof, bending said plate and flaps to form a central surface or panel with the central flap extending therefrom, two side panels each having a side flap extending therefrom, and a rear panel formed from said flaps arranged in overlapping heat conductive relation and mounting on the rear panel in heat conductive relation with the innermost flap, the heat generating components of the equipment.

Having briefly described the invention, a more detailed description is now made by reference to an exemplary embodiment thereof illustrated in the accompanying drawing which forms a part of the specification, wherein:

FIGURES 4, 5, 6 and 7 are views in perspective illustrating two methods for making a heat exchanger cover in accordance with the invention;

FIGURE 8 is a view in perspective illustrating a heat exchanger cover in accordance with the invention hingedly secured to a module chassis frame;

FIGURE 9 is a fragmentary vertical sectional view taken along line 9—9 of FIGURE 10 showing one method of thermally coupling a heat generating component to a heat exchanger cover in accordance with the invention.

Figure 1:
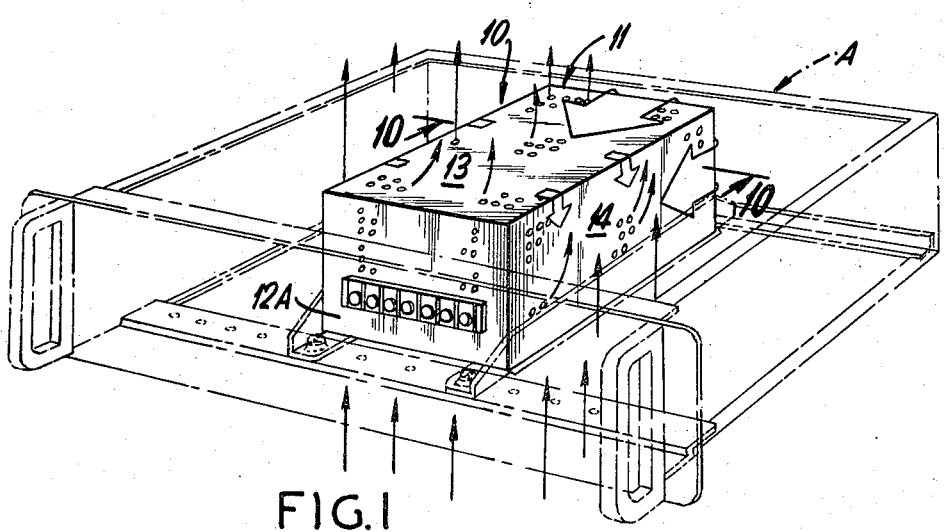
FIGURE 1 is a view in perspective of an electronic module provided with a heat exchanger cover in accordance with the invention mounted for use on its bottom or chassis surface.
Figures 2, 10:
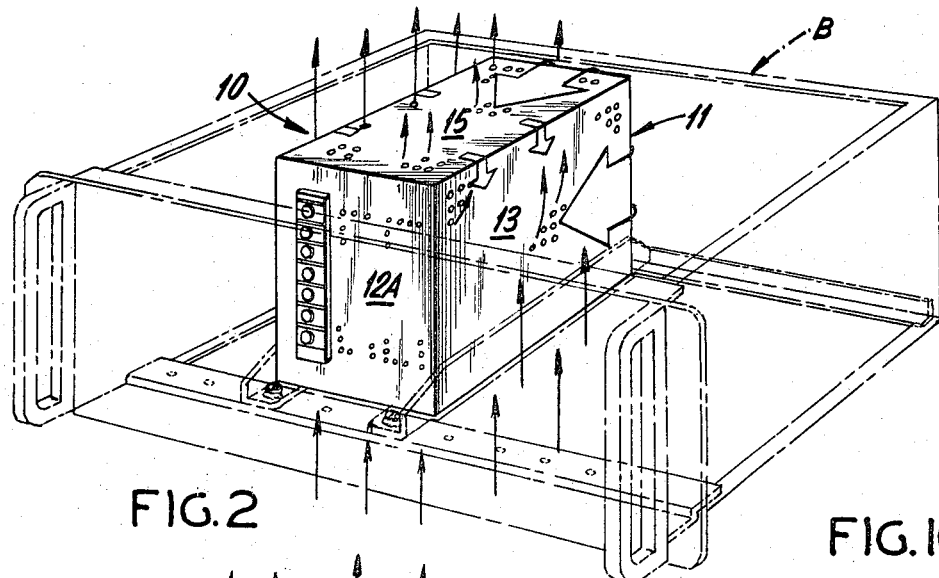
FIGURE 2 is a view in perspective of the module of FIGURE 1 mounted for use on its side surface.
FIGURE 10 is a fragmentary vertical sectional view taken along line 10—10 of FIGURE 1 illustrating a module cover functioning as a heat exchanger in accordance with the invention.
Figure 3:
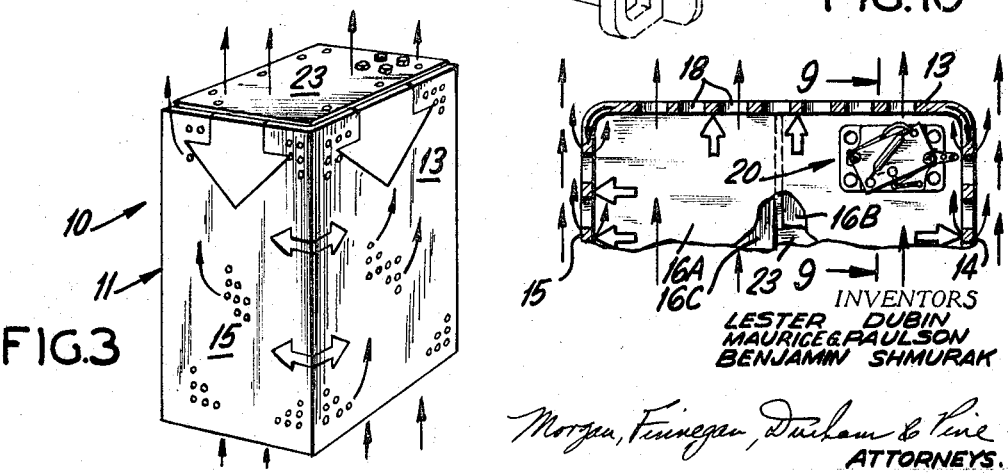
FIGURE 3 is a view in perspective of the module of FIGURE 1 standing for use on its end surface.

Turning now in detail to the accompanying drawing wherein like numerals are employed to designate like parts in the several figures, a power supply module designated generally at 10 provided with a heat exchanger cover 11 in accordance with the invention is shown in FIGURES 1, 2 and 3 positioned for operation on each of three different surfaces. In FIGURE 1, module 10 is illustratively mounted on the bottom surface of its chassis frame 12 within a rack adapter frame A, illustratively 3½ inches in height for insertion and use in a standard-size rack opening of a conventional cabinet (not shown).

FIGURE 2 shows module 10 mounted on its side surface or panel 14 within a rack adapter frame B, illustratively 5¼ inches in height for insertion and use in a different standard-size rack opening of a conventional cabinet. The module of FIGURES 1 and 2 is shown in FIGURE 3 sitting on its front end chassis surface 12A for use on a table, bench or the like. Units can, in fact, be mounted in any of the three illustrated positoins on a chassis to power other circuitry located on the chassis. Module 10 may be operated in any of these positions without the usual derating because its heat exchanger 11 is equally effective regardless of the orientation which it assumes during use, as will be fully understood from a further reading of the specification.

Modules provided with heat exchangers in accordance with the invention may be mounted in rack adapters of the conventional type. However, rack adapters constructed in accordance with copending application entitled, "Rack Adapter for Modular Electronic Equipment," having Ser. No. 542,362, and filed simultaneously herewith, are particularly suited for use with such modules, especially power supply modules.

Referring to FIGURE 8, the heat exchanger 11 illustrated herein as an exemplary embodiment of the invention is essentially a four-sided cover adapted to fit over and fully enclose, in conjunction with a module chassis frame 12, the components of the electronic module. The cover is formed with a central surface or panel 13, two identical side surfaces or panels 14 and 15, and a rear surface or panel 16, these panels serving as fins for the dissipation of heat when the module is in operation. Rear panel 16 is adapted to be coupled in heat conductive relation to the heat generating components of th modul and is illustratively provided with four clearance holes 17 for this purpose. Rear panel 16, is, in accordance with the invention, integrally formed with panels 13, 14 and 15 to provide uniform heat conductive paths thereto from the heat source. Preferably, panels 14 and 15 are integrally formed with panel 13 for optimum heat distribution throughout the entire heat exchanger surface. Additionally, central and side panels 13, 14 and 15 are ventilated by means of a plurality of groups of apertures 18 formed therein so that cooling air, circulated by convection or the use of fans, may enter and depart the module.

In order to facilitate the servicing and general handling of the module, cover 11 is shown hingedly secured to the chassis frame 12 by means of a pair of hinges 19. Thus, the cover may be rotated back away from the chassis frame (see FIGURE 8) to permit easy access to the components of the module located therein. However, the cover may be secured to the chassis frame in any manner desired. For example, the cover may be provided with flanges or lips to permit the sliding of the cover onto and off of the chassis frame.

FIGURE 9 illustrates a transistor 20 mounted onto rear panel 16 to obtain a heat conductive relationship between the heat exchanger cover and the transistor which illustratively comprises the heat source of the module. Transistor 20 is mounted onto a heat conductive base member 21 which is provided with four threaded holes (see FIGURE 10) to accommodate mounting screws 22. Base 21 is secured to rear panel 16 by means of screws 22, and is pressed thereby flush against the rear panel of optimum heat conduction therebetween. A nameplate 23 may be positioned between the screw heads and the rear panel as shown.

Figure 4:
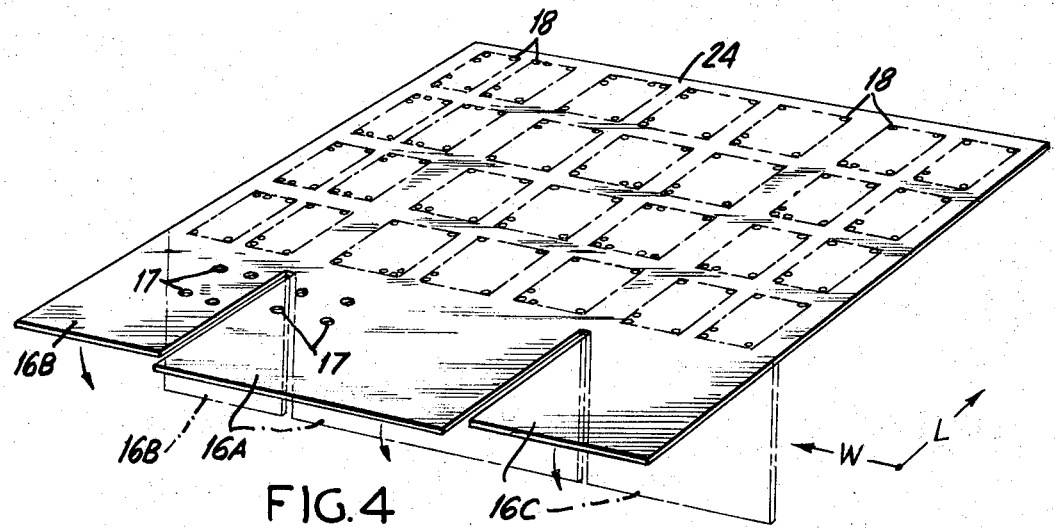

FIGURES 4, 5, 6 and 7 illustrate, in accordance with the invention, two methods of making a heat exchanger cover of the type described herein. A flat rectangular plate 24 is formed from a suitable heat conductive material (FIGURE 4). This plate is provided with a flap 16A extending centrally from one of its ends. Extending from the same end and spaced apart from the sides or edges of central flap 16A are two substantially similar flaps 16B and 16C. Preferably, the length [1] of central flap 16A is approximately equal to the width [2] or lateral dimension of each of side flaps 16B and 16C, and the width or lateral dimension of central flap 16A is approximately equal to twice the length of each of side flaps 16B and 16C.

Plate 24 is provided with a plurality of groups of apertures 18 for the passage of air therethrough. These groups of apertures are arranged to define a central portion coextensive in width or lateral dimension with central flap 16A, and two side portions coextensive in width or lateral dimension with side flaps 16B and 16C.

As shown in FIGURE 4, central flap 16A and side flap 16B are each provided with four clearance holes 17 arranged for alignment when the final cover configuration is obtained. These clearance holes are adapted to receive mounting screws 22 for securing the transistor base 21 to the cover. While the invention is illustrated in conjunction with only one transistor, the flaps may be adapted to receive any suitable number of heat generating components.

After the plate has been formed as above described, it is then bent to form the finished cover configuration (FIGURE 7). In its final form, the central portion of the plate forms central panel 13 of the cover, the side portions form side panels 14 and 15, and flaps 16A, 16B and 16C overlap in heat conductive relation to form the rear panel 16.

The bending of plate 24 may be accomplished in any manner desired. For example, two forming dies may be used. The first die may bend the flaps through approximately 90° angles (see FIGURE 4); and the second die may bend the side portions of the plate, together with side flaps 16B and 16C, through 90° angles to obtain the final cover configuration.

Figure 5:
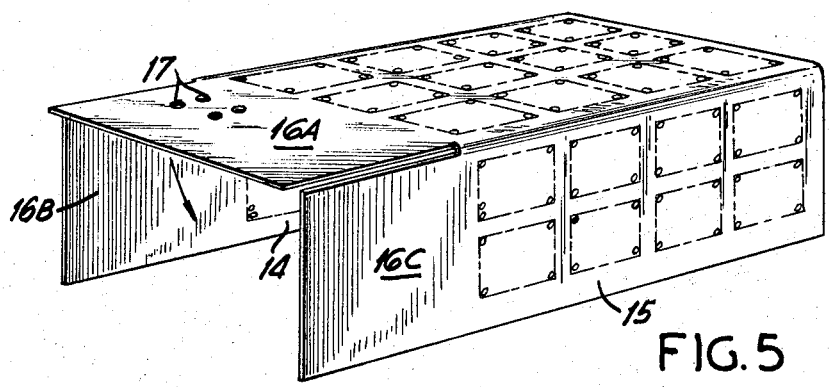
Figure 6:
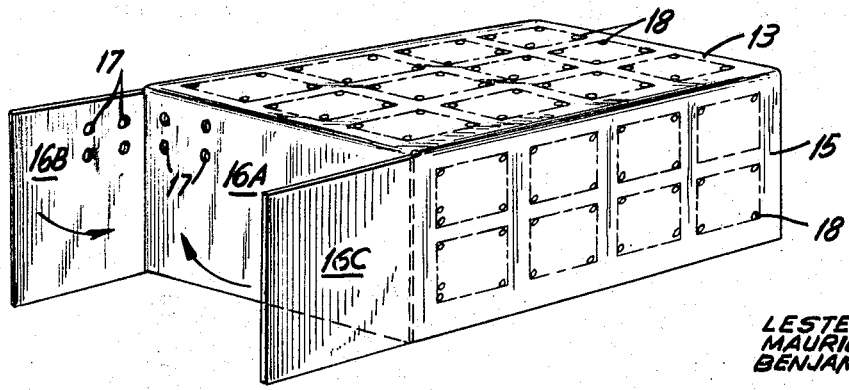

Alternatively, the plate may be bent first to form the central and side panels 13, 14 and 15 (see FIGURE 5). Next, the central flap 16A may be bent downwardly approximately 90° (FIGURE 6). Finally, the side flaps 16B and 16C may be bent inwardly approximately 90° each so as to overlap the central flap 16A.

In the final cover configuration, the central flap 16A may comprise the innermost flap of the rear panel 16 as in the illustrative embodiment or the flaps may be arranged or bent so that the central flap becomes the outer flap of the panel.

When finally assembled for operation, mounting screws 22 serve to maintain the flaps in overlapping heat conductive relation. However, in order to facilitate the mounting of the heat generating components to the rear panel, the flaps may be spot-welded together to temporarily maintain their overlapping relationship. Where a nameplate 23 is employed, it may be riveted to the outside of the rear panel 16, this riveting also serving to maintain the overlapping relationship of the flaps.

The heat exchanger cover functions in the following manner to provide rapid and effective cooling of the heat generating components of the module. The heat generated by these components is conducted directly to the rear panel of the cover, the rear panel being of a lower temperature and being thermally coupled thereto. This panel functions dually as a heat radiating fin and as an intermediate conductor of heat to the other panels of the cover. Some heat is radiated by the rear panel to the atmosphere, the amount depending upon whether or not it is in a vertical orientation. The heat not radiated by the rear panel is conducted to the remaining panels of the cover along continuous and uniform heat conductive paths provided by the integral construction of the rear panel with the rest of the cover. The remaining panels similarly radiate to the atmosphere and also serve to conduct heat away from the heat source toward to opposite end of the cover. Thus, in effect, the cover provides a plurality of heat conducting and radiating fins having a relatively large combined area for heat dissipation.

While all of the panels serve as heat radiators, those which have assumed vertical orientations during operation are more effective for this purpose due to the fact that they are rapidly cooled by the flow of cooling air constantly rising along their surfaces. Not only are the outer surfaces of the panels cooled in this manner, but their inner surfaces are also cooled by the air which enters and departs the module through the apertures formed in the cover. Hence the surface area available for effective heat radiation is greatly increased.

The vertically oriented panels carry a larger heat radiating load as heat tends to flow from the horizontally oriented panels to the cooler vertical panels. Where the entire cover is of a unitary construction, as preferred, the distribution of heat between panels is optimized.

Due to the fact that the panels are arranged in an orthogonal relationship one to the other to form the cover configuration, there is always a sufficient amount of the total surface area of these panels in a vertical orientation to permit the module to be operated in a plurality of positions without derating.

Referring to the drawing, when the module is positioned as in FIGURE 1, the rear panel 16 and side panels 14 and 15 are vertically oriented. FIGURES 9 and 10 illustrate the cover oriented as in FIGURE 1 in the process of dissipating heat. It is to be understood, however, that FIGURES 9 and 10 are equally illustrative of the operation of the cover when the module is positioned as in FIGURES 2 and 3. When the module is in the position shown in FIGURE 2, panels 13 and 16 are vertically oriented, and when positioned as in FIGURE 3, panels 13, 14 and 15 are vertically oriented.

All of the panels of the cover are in optimum heat conductive relation with the source of heat due to the unitary construction of the cover so that rapid and effective heat dissipation is achieved regardless of orientation.

The invention in its broader aspects is not limited to the specific elements, steps, techniques, methods, combinations and arrangements shown and described, but departures may be made therefrom within the scope of the accompanying claims without departing from the principles of the invention and without sacrificing its chief advantages.

What is claimed is:
1. A multi-positional power supply module comprising:
    (a) heat generating temperature sensitive electronic components, and
    (b) a heat exchanger for said components adapted to serve as at least a partial outer enclosure for said module, said exchanger being formed from heat conductive material and including a central panel, two side panels extending perpendicularly from said central panel along its opposite edges, and a rear panel extending perpendicularly from said central and side panels, said heat generating components being directly thermally coupled in heat conductive relation to said rear panel,
    (c) said rear panel being formed from integral flap extensions of said central and side panels bent and arranged in an overlapping heat conductive relationship to thereby provide effective heat conductive paths from said heat generating components directly to said panels, said panels serving as a plurality of orthogonal heat dissipating surfaces permitting operation of said module in a plurality of orientations without the need for derating,
    (d) said central and side panels being substantially planar and having a plurality of apertures formed therein for ventilation of said module.

---
[1] I.e., along axis L.
[2] I.e., along axis W.

2. A module as defined in claim 1 wherein each of said flaps is coextensive with the panel from which it depends.

3. A module as defined in claim 2 wherein said side flaps are mirror images of one another, the lateral dimension of each being approximately equal to the longitudinal dimension of said central flap.

4. A module as defined in claim 3 wherein the longitudinal dimension of each of said side flaps is approximately equal to one-half the lateral dimension of said central flap.

5. A module as defined in claim 4 wherein said central and side panels are of a unitary construction for optimum distribution of heat therebetween.

6. A module as defined in claim 1 wherein said central and side panels are of a unitary construction for optimum distribution of heat therebetween.

7. A method of producing a multi-positional power supply module of the type having heat generating temperature sensitive electronic components, comprising the steps of:
 (a) forming from heat conductive material a flat rectangular plate having a plurality of groups of apertures formed therein and having further, a centrally located flap and two side flaps extending in parallel spaced-apart relation one to the other from one end thereof,
 (b) bending said plate and flaps to form an apertured central panel, two apertured side panels extending at right angles from said central panel, and a rear panel formed from said flaps being arranged in overlapping heat conductive relation, and
 (c) directly thermally coupling in heat conductive relation to the innermost of said overlapping flaps said heat generating components.

8. A method as described in claim 7 wherein said plate is bent to form said central and side panels prior to bending said flaps.

9. A method as described in claim 8 wherein said central flap is bent prior to bending said side flaps whereby the later overlap the former.

10. A method as described in claim 7 wherein the final heat exchanger configuration is obtained from a two-step operation, the first step comprising bending said flaps through approximately 90° angles, and the second step comprising bending the side portions of the flat plate along with the side flaps through approximately 90° angles.

11. A method as described in claim 7, wherein said central flap depends from and is coextensive with said central panel and each of said side flaps depends from and is coextensive with one of said side panels.

12. A method as described in claim 11 wherein said side flaps are mirror images of one another, the lateral dimension of each being approximately equal to the longitudinal dimension of said central flap.

13. A method as described in claim 12 wherein the longitudinal dimension of each of said side flaps is approximately equal to one-half the lateral dimension of said central flap.

14. A module as defined in claim 1, wherein said heat generating components are clamped directly onto said rear panel to achieve said heat conductive relationship therebetween.

15. A module as defined in claim 1, including a plurality of bolts which pass through said flaps forming said rear panel and clamp said heat generating components directly to the innermost of said flaps, said components thereby being coupled in heat conductive relation with all of said flaps of said rear panel.

References Cited
UNITED STATES PATENTS

| | | |
|---|---|---|
| 662,801 | 11/1900 | Mumford. |
| 1,811,135 | 6/1931 | Knowlton. |
| 2,057,700 | 10/1936 | Bomberger. |
| 2,457,347 | 12/1948 | Casler et al. |
| 2,488,710 | 11/1949 | Cooper. |
| 2,522,660 | 9/1950 | Bledsoe. |
| 2,658,101 | 11/1953 | Coxe. |
| 2,690,077 | 9/1954 | Lisenbee. |
| 2,774,808 | 12/1956 | Bullock. |
| 2,879,977 | 3/1950 | Trought _____ 165—80 |
| 3,113,694 | 12/1963 | Sulzer. |
| 3,167,688 | 11/1965 | Hein. |
| 3,197,812 | 6/1965 | Staver _____ 165—80 |
| 3,231,247 | 1/1966 | Goettl. |

OTHER REFERENCES

"Electronic Design," issue of July 5, 1962, page 16, advertisement of Staver Co.

ROBERT A. O'LEARY, *Primary Examiner.*

C. SUKALO, *Assistant Examiner.*